(12) United States Patent
Lin

(10) Patent No.: US 8,486,848 B2
(45) Date of Patent: Jul. 16, 2013

(54) LAMINATE AND ARTICLE FOR DAILY USE

(76) Inventor: Chun-Wei Lin, Wu-Jih Hsiang (TW)

( * ) Notice: Subject to any disclaimer, the term of this patent is extended or adjusted under 35 U.S.C. 154(b) by 830 days.

(21) Appl. No.: 12/472,107

(22) Filed: May 26, 2009

(65) Prior Publication Data

US 2009/0297794 A1 Dec. 3, 2009

(30) Foreign Application Priority Data

May 27, 2008 (TW) .............................. 97209233 U

(51) Int. Cl.
*B32B 27/12* (2006.01)
*B32B 27/32* (2006.01)

(52) U.S. Cl.
USPC ........................................ 442/394; 442/398

(58) Field of Classification Search
USPC ................... 442/394, 398, 396; 428/214, 219
See application file for complete search history.

(56) References Cited

U.S. PATENT DOCUMENTS

| 5,804,292 A * | 9/1998 | Ishitoya et al. ............. 428/304.4 |
| 6,695,939 B1 * | 2/2004 | Nakamura et al. ........... 156/62.8 |
| 2006/0177667 A1 | 8/2006 | Lin |

FOREIGN PATENT DOCUMENTS

JP          3-111535          11/1991

\* cited by examiner

*Primary Examiner* — Lynda Salvatore
(74) *Attorney, Agent, or Firm* — Merchant & Gould P.C.

(57) ABSTRACT

A laminate includes a base layer being made from one of woven fabrics, knitted fabrics, and non-woven fabrics, and having two surfaces, and a thin film layer made of a polyvinyl butyral-based composition and covering one of the two surfaces of the base layer. An article for daily use, at least one part of which is made of the laminate, is also disclosed.

13 Claims, 9 Drawing Sheets

LAMINATE AND ARTICLE FOR DAILY USE

CROSS-REFERENCE TO RELATED APPLICATION

This application claims priority of Taiwanese application no. 097209233, filed on May 27, 2008.

BACKGROUND OF THE INVENTION

1. Field of the Invention

This invention relates to a laminate and an article for daily use, more particularly to a laminate including a base layer and a polymeric film, and an article for daily use having at least one part made of the laminate.

2. Description of the Related Art

It is well known that a laminate, which is produced by laminating a polymeric film onto a base layer to reinforce and stabilize the base layer, has an enhanced strength, and exhibits excellent waterproofing property and workability. Thus, such laminate is commonly utilized in the fabrication of an article for daily use, such as a raincoat, a backpack, a bag, shoes, an article of clothing, an article of furniture, a sporting article, a writing tool, a toy, or the like.

From the aspects of cost and touch feeling, in the past, the polymeric film of the laminate is usually made of a polyvinyl chloride (PVC) based composition. Because the PVC-based polymeric film contains a large amount of plasticizer, it is hard to recycle PVC from a waste of such laminate. On the other hand, incineration disposal of PVC will liberate environmentally damaging materials, i.e., dioxin along with heavy metal. Therefore, the PVC-based laminate is being gradually phased out.

In order to solve the problem associated with the use of PVC, after taking the cost and the touch feeling of a laminate into consideration, the present applicant disclosed a laminate, which is produced by laminating and adhering a surface-modifying layer onto a polymeric film through an adhesion layer, in US 2006/0177667A1 and Japanese utility model no. 3111535. The surface-modifying layer is a polyurethane (PU) layer that is provided with good touch feeling. The polymeric film is made of styrene-butadiene-styrene (SBS) block copolymer-based composition, which is environmentally safe and easy to recycle.

However, in practice, it is found that the SBS block copolymer easily decomposes and is difficult to be preserved. Therefore, the SBS block copolymer-based layer, even the whole laminate, may have a poor durability and a poor weathering performance.

SUMMARY OF THE INVENTION

Therefore, an object of the present invention is to provide a laminate that has an enhanced strength similar to that of the PVC containing laminate, that exhibits excellent waterproof property, workability, and touch feeling, that is environmentally safe and easy to recycle, and that has a good durability/weathering performance.

According to one aspect of the present invention, there is provided a laminate comprising: a base layer being made from one of woven fabrics, knitted fabrics, and non-woven fabrics, and having two surfaces; and a thin film layer made of a polyvinyl butyral-based composition and covering one of the two surfaces of the base layer.

According to another aspect of the present invention, there is provided an article for daily use, which is selected from the group consisting of a traveling case, a backpack, a bag, a cover, a raincoat, an article of clothing, shoes, an article of furniture, a curtain, automotive upholstery fabrics, a table cloth, a substrate for advertisement, a toy, a tent, a projection screen, and an umbrella, and at least one part of which is made of the laminate of this invention.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
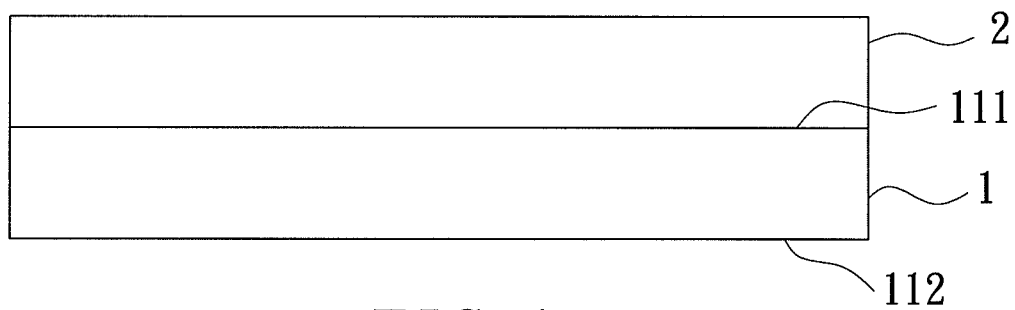
FIG. 1 is a side view illustrating a laminate of the first embodiment according to the present invention.

Referring to FIG. 1, a laminate of the first embodiment of this invention comprises: a base layer 1 having two surfaces 111, 112; and a first thin film layer 2 covering one 111 of the two surfaces 111, 112 of the base layer 1.

The base layer 1 is made from one of woven fabrics, knitted fabrics, and non-woven fabrics. The woven fabrics can be classified as plain-woven fabrics, twill woven fabrics, and satin-woven fabrics. The knitted fabrics can be classified as warp-knit fabrics and weft-knit fabrics. Preferably, the base layer is made of polyamide fibers, polyester fibers, polyacrylonitrile fibers, polyethylene fibers, polypropylene fibers, polyvinyl alcohol fibers, polytetrafluoroethylene fibers, polyurethane fibers, acetate fibers, triacetate fibers, glass fibers, seed fibers, bast fibers, leaf fibers, or combinations thereof.

The first thin film layer 2 is made of a polyvinyl butyral (PVB)-based composition including PVB and an additive component.

The first thin film layer 2 made of the PVB-based composition is provided with the merits of the conventional polymeric film, i.e., the layer 2 is waterproof and also functions to reinforce the texture of the base layer 1. Besides, the first thin film layer 2 does not possess the toxicity like PVC, is provided with a better flexibility than the PVC containing polymeric film, and is environmentally safe and easy to recycle.

Examples of the additive component that may be added into the PVB-based composition include a plasticizer, a lubricant, an anti-oxidant, an UV absorber, a polymer modifier, a colorant, a filler, and combinations thereof.

The plasticizer is used for granting a softening property to PVB. Examples of the plasticizer include acetyl tributyl citrate, acetyl trioctyl citrate, alkyl benzyl phthalate, alkyl phthalate, blown linseed oil, butyl benzyl phthalate, butyl ricinoleate, castor oil, dialkyl adipate, dialkyl phthalate, dibutyl phthalate, dihexyl adipate, diisononyl cyclohexane-dicarboxylate, dioctyl adipate, dioctyl phthalate, glycol dibutyrate, isodecyl diphenyl phosphate, n-ethyl toluenesulfonamide, polyethylene glycol, tert-butylphenyl diphenyl phosphate, toluenesulfonamide, triaryl phosphate ester blend, tributyl citrate, tricresyl phosphate, triethyl citrate, triethylene, triethylene glycol di-2-ethylhexanoate, triphenyl phosphate, 2-ethylhexyl diphenyl phosphate, and combinations thereof. The amount of plasticizer component preferably ranges from 3~80 parts by weight per 100 parts by weight of the PVB in the PVB-based composition.

Examples of the lubricant include polyethylene wax, ethylene bis-stearamide, stearic acid, zinc stearate, calcium stearate, and combinations thereof. The amount of the lubricant preferably ranges from 0.05~5 parts by weight per 100 parts by weight of the PVB in the PVB-based composition.

The polymer modifier is used for adjusting physical properties of the first thin film layer 2, for example, the hardness, impact resistance, low temperature resistance, impact bending strength, etc. Examples of the polymer modifier include polymethyl methacrylate (PMMA), ethylene-vinyl-acetate (EVA) copolymer, methyl methacrylate-butadiene-styrene (MBS) copolymer, styrene-butadiene-styrene (SBS) block copolymer, and combinations thereof. The amount of the polymer modifier preferably ranges from 0~100 parts by weight per 100 parts by weight of the PVB in the PVB-based composition.

Preferably, per 100 parts by weight of the PVB in the PVB-based composition, the anti-oxidant is in an amount ranging from 0.1~3 parts by weight, the UV absorber is in an amount ranging from 0.1~3 parts by weight, the colorant is in an amount ranging from 0~12 parts by weight, and the filler is in an amount ranging from 0~150 parts by weight.

When the laminate shown in FIG. 1 is utilized in one part of an article for daily use, either the base layer 1 or the first thin film layer 2 may be disposed at the outer side of the article to serve as a face layer. The first thin film layer 2 may be provided with patterns by any surface treatment, such as embossing or printing, or may be proved with a special touch feeling by a surface modifying treatment (surface touch treatment), such as surface roughening or smoothing treatments, to match the design of the article. Furthermore, the embossing can be conducted by pressing the first thin film layer 2 against a metal (or silicon) embossing roller, or by negative pressure embossing, i.e., by vacuum decompressing the first thin film layer 2 to deform the surface.

Moreover, the base layer 1 of the laminate of the first embodiment has originally porous and rough surfaces thereon, and is provided with a larger contact area, and thus, the first thin film layer 2 can be directly adhered to the surface 111 of the base layer 1 by a thermal melting or a coating method. This is because when the contact area between the base layer and the first thin film layer is large, the bonding strength therebetween is also strong.

When using the thermal melting method, the first thin film layer 2 produced by thermal calendering rollers is thermoplastic, and thus, can be thermal melted to be directly adhered to the surface 111 of the base layer 1. In this case, the first thin film layer 2 preferably has a thickness ranging from 0.05 mm to 1.5 mm.

When using the coating method, the first thin film layer 2 is formed by dissolving the PVB-based composition in a solvent composition to form a mixture, coating the mixture onto the surface 111 of the base layer 1 through gravure coating or knife coating, followed by drying. In this case, the first thin film layer 2 preferably has a thickness ranging from 0.001 mm to 0.08 mm.

Figure 6:
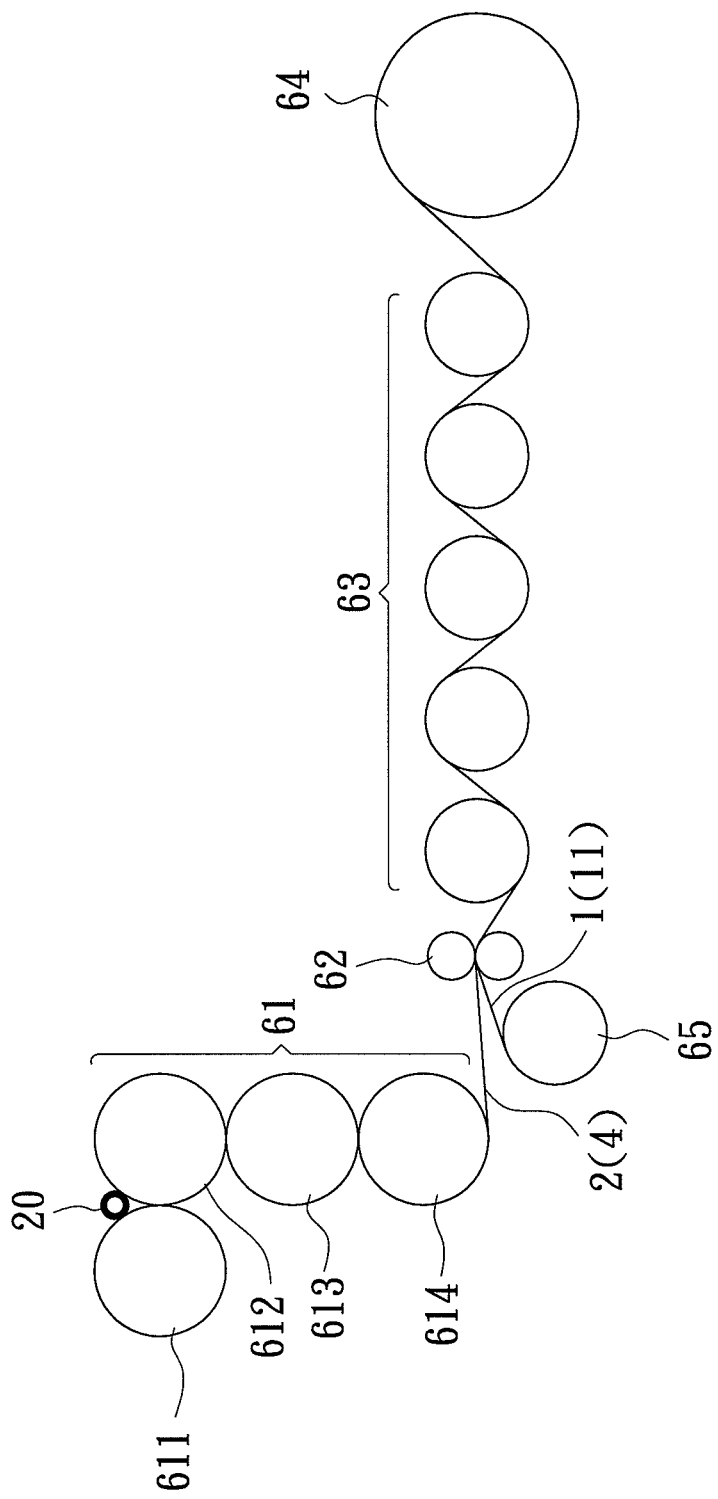
FIG. 6 is a schematic diagram of a calender device for forming a laminate.

The laminate of the first embodiment is fabricated by thermal melting the first thin film layer 2, which is produced by the thermal calendering rollers, to adhere directly to the base layer 1. To be specific, the laminate of the first embodiment is fabricated by a calender device as shown in FIG. 6. The calender device includes a reverse L-type calendering roller set 61 that has four calendering rollers 611, 612, 613, 614, an embossing roller 62 for embossing the thin film layer 2, cooling rollers 63, a laminate take-up roller 64, and a base layer run-out roller 65. During operation, among the four calendering rollers 611, 612, 613, 614 of the calendering roller set 61, the calendering rollers 613, 614 are preferably maintained at the temperature ranging from 120 to 150° C. Furthermore, the transporting speed of the base layer 1 and the first thin film layer 2 is controlled to a range from 15 to 60 mm/min. Reference number 20 denotes the PVB-based composition that is already mixed and melted, and that flows into the calender device for laminating the thin film layer 2 onto the base layer 1 when making the laminate.

During the operation of the calender device in FIG. 6, the PVB-based composition 20, after a calendering process conducted by the calendering roller set 61, is formed into the first thin film layer 2 to be combined with the base layer 1 supplied from the run-out roller 65 at the embossing roller 62 where the base layer 1 and the first thin film layer 2 are laminated while executing an embossing process. Thereafter, a laminate including the base layer 1 and the first thin film layer 2 is conveyed to pass through the cooling rollers 63 and is wound as a roll by the take-up roller 64.

The laminate of the first embodiment is produced by the calender device.

Figure 2:
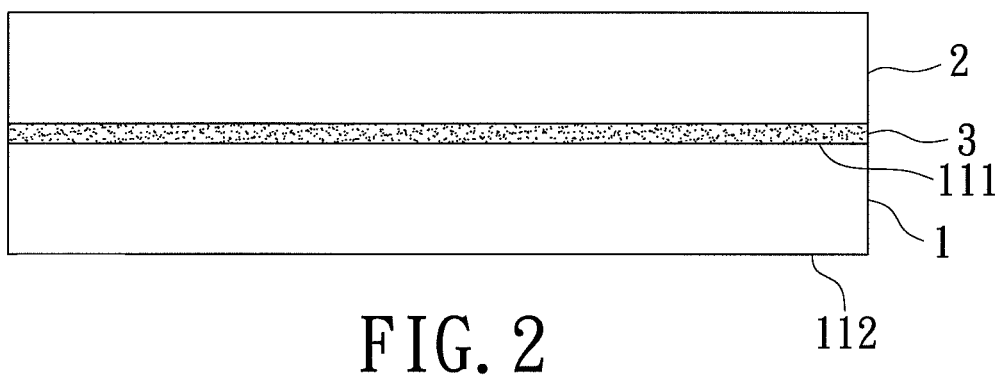
FIG. 2 is a side view illustrating a laminate of the second embodiment according to the present invention.

FIG. 2 illustrates the second embodiment of the laminate of this invention. In the second embodiment, portions, which are the same as those of the first embodiment, are denoted by the same reference numbers, and a detailed explanation of the identical portions is omitted below.

The second embodiment differs from the first embodiment only in that the laminate further comprises a first adhesion layer 3, and that the first thin film layer 2 is adhered to the surface 111 of the base layer 1 through the first adhesion layer 3.

The first adhesion layer 3 is made of an adhesive. The adhesive can be selected from any adhesives that are capable of adhering the base layer 1 and the first thin film layer 2 together. Preferably, the adhesive is a commercially available adhesive, such as a polyurethane adhesive (PU adhesive), an acrylate adhesive, a polyvinyl butyral adhesive, a polychloroprene rubber adhesive, or combinations thereof.

In the second embodiment, the first adhesion layer 3 is made of the PU adhesive. Normally, the PU adhesive includes a main agent made of PU, and a cross-linker. Examples of the cross-linker include melamine, phenolic resin, di-aldehyde, and isocyanate. The amount of the cross-linker preferably ranges from 1~15 parts by weight per 100 parts by weight of the main agent.

By the cross-linking between the PVB in the first thin film layer 2 and the PU in the first adhesion layer 3, the base layer 1 and the first thin film layer 2 can be strongly combined to each other.

Figure 7:
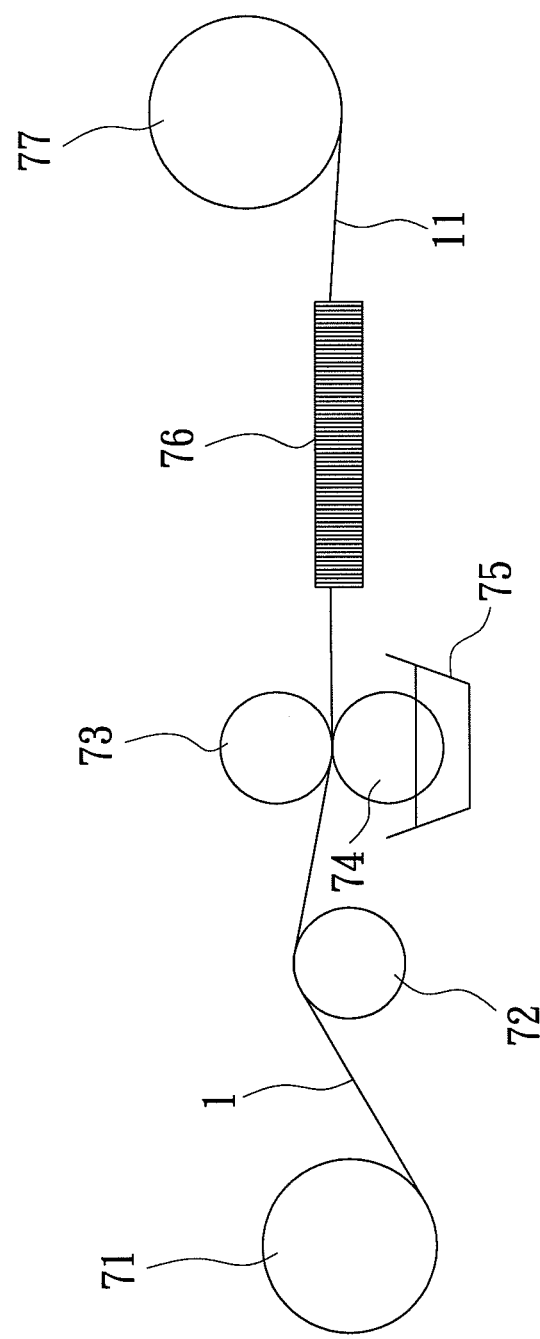
FIG. 7 is a schematic diagram of a gravure-coating device.
Figure 8:
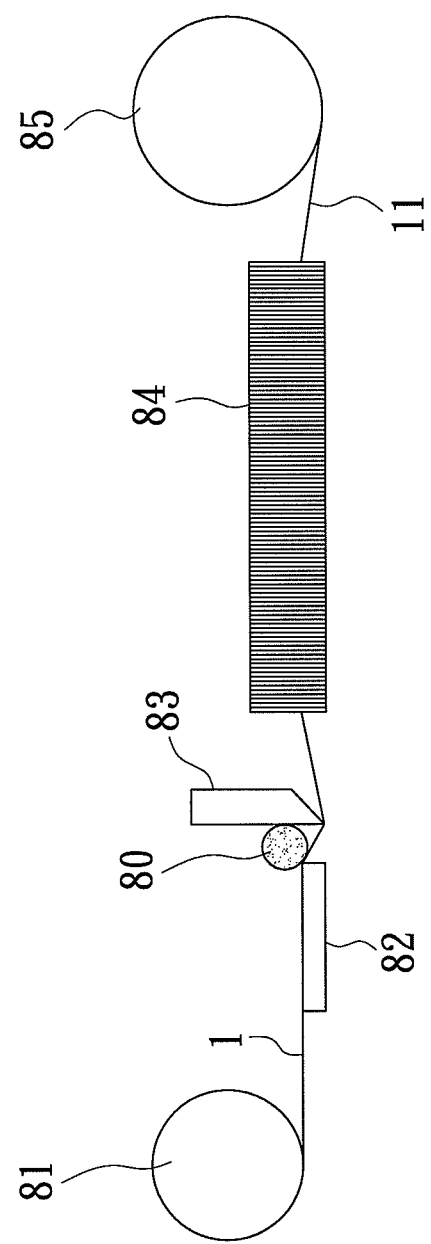
FIG. 8 is a schematic diagram of a knife-coating device.

The first adhesion layer 3 can be adhered onto the base layer 1 through a gravure-coating device shown in FIG. 7 or a knife-coating device shown in FIG. 8.

The gravure-coating device in FIG. 7 includes a base layer run-out roller 71, a guiding roller 72 for guiding the base layer 1, a rubber roller 73, a gravure roller 74 with an engraved pattern, a tank 75 for storing the adhesive, an oven 76, and a semi-product take-up roller 77.

When using the gravure-coating device in FIG. 7, the base layer 1 is supplied by the run-out roller 71, guided by the guiding roller 72, and conveyed to pass through a gap between the rubber roller 73 and the gravure roller 74. In the meantime, the adhesive collected from the tank 75 by the engraved pattern of the gravure roller 74 in an operation state is transferred to the base layer 1 so as to form the base layer 1 adhered with the first adhesion layer 3. Subsequently, the base layer 1 adhered with the first adhesion layer 3 is transported to the oven 76 so as to dry and harden the first adhesion layer 3. Then, a semi-product 11 including the base layer 1 and the first adhesion layer 3 is wound as a roll by the take-up roller 77.

In the process of the gravure coating, the transporting speed of the base layer 1 is preferably controlled in a range from 20 to 50 mm/min, and the temperature of the oven 76 is preferably controlled at a temperature ranging from 70 to 135° C.

The knife-coating device in FIG. 8 includes a base layer run-out roller 81, a supporting plate 82 for guiding the base layer 1, a coating knife 83 for coating the adhesive on the base layer 1, an oven 84, and a semi-product take-up roller 85. Furthermore, reference number 80 denotes the adhesive for forming the adhesive layer 3, which is already mixed and melted, and which is to be smeared onto the base layer 1 by the knife-coating device to form the adhesive layer 3 when making the semi-product 11.

The operation of the knife-coating device is substantially the same as that of the gravure-coating device except that the coating of the adhesion layer 3 is conducted by the coating knife 83 which uniformly disperses and smears the adhesive 80 onto the fabric 1 from an end part of the supporting plate 82.

In the process of the knife coating, the transporting speed of the base layer 1 is preferably controlled in a range from 20 to 50 mm/min, and the temperature of the oven 84 is preferably controlled at a temperature ranging from 70 to 135° C.

Finally, the laminate of the second embodiment can be produced by using the calender device in FIG. 6 and by replacing the base layer 1 in the calender device with the semi-product 11 that is fabricated by the gravure-coating device in FIG. 7 or the knife-coating device in FIG. 8.

Figure 3:
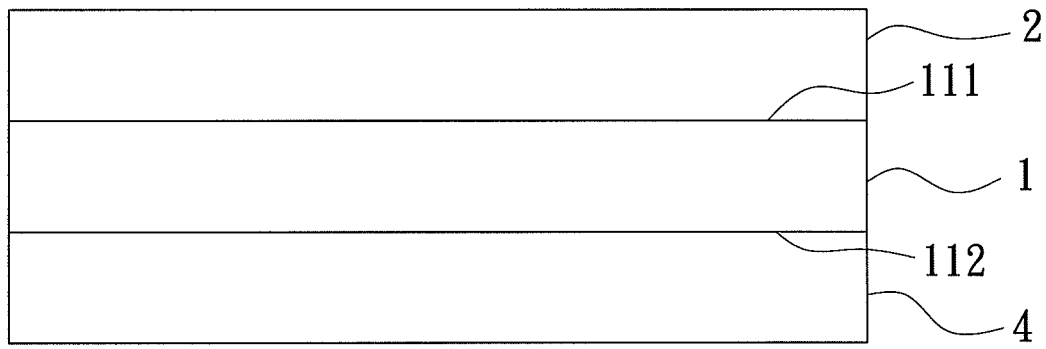
FIG. 3 is a side view illustrating a laminate of the third embodiment according to the present invention.

FIG. 3 illustrates the third embodiment of the laminate of this invention. In the third embodiment, portions, which are the same as those of the first embodiment, are denoted by the same reference numbers, and a detailed explanation of the identical portions is omitted below.

The third embodiment differs from the first embodiment only in that the laminate further comprises a second thin film layer 4 made of a PVB-based composition and covering another one 112 of the two surfaces 111, 112 of the base layer 1. As to examples of the second thin film layer 4, they are not described herein since they are substantially the same as those of the first thin film layer 2 in the first embodiment.

It should be noted that the laminate in the third embodiment has the base layer 1 in a net-like form. Thus, the first and second thin film layers 2, 4 can contact each other through the net-like base layer 1 in a process of laminating, and can be thermal melted to bond together without provision of an adhesive layer, since they are both made of the PVB-based composition.

Figure 9:
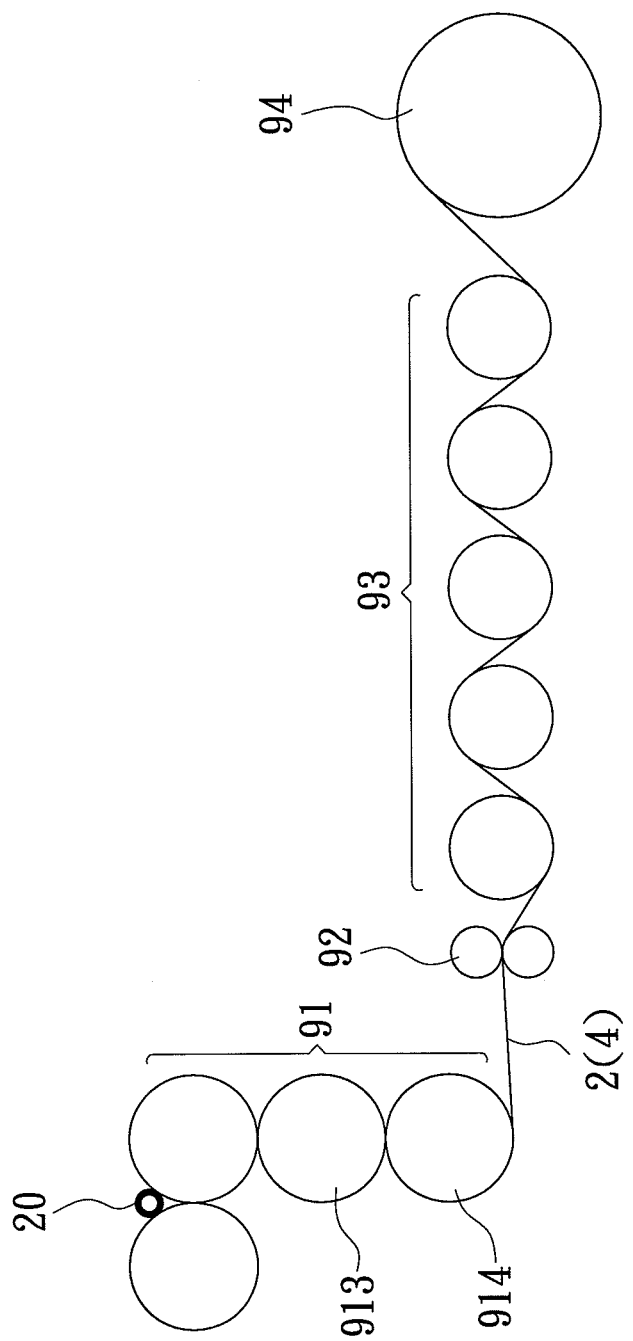
FIG. 9 is a schematic diagram of another calender device for forming a thin film layer.
Figure 10:
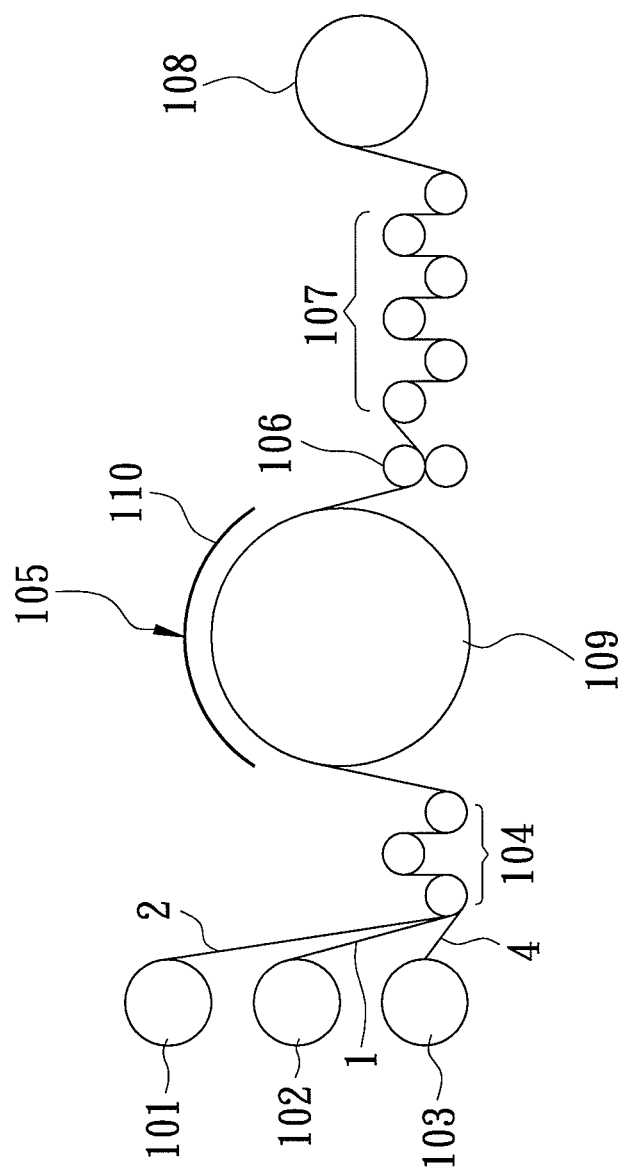
FIG. 10 is a schematic diagram of a bonding device.

Furthermore, the laminate of the third embodiment can be produced through a calender device shown in FIG. 9 and a bonding device shown in FIG. 10.

The calender device in FIG. 9 is a device for forming the first or second thin film layer 2 or 4, and includes a reverse L-type calendering roller set 91 that has four calendering rollers 911, 912, 913, 914, an embossing roller 92 for embossing the thin film layer 2 or 4, cooling rollers 93, and a take-up roller 94 for the thin film layer 2 or 4. During operation, among the four calendering rollers 911, 912, 913, 914 of the calendering roller set 91, the calendering rollers 913, 914 are preferably maintained at the temperature ranging from 120 to 150° C. Furthermore, the transporting speed of the thin film layer 2 or 4 is controlled in a range from 15 to 60 mm/min.

The bonding device in FIG. 10 is a device for laminating the first and second thin film layers 2, 4 together through the base layer 1. The bonding device includes three run-out rollers 101, 102, 103 for supplying the first thin film layer 2, the base layer 1, and the second thin film layer 4, respectively, a guiding roller 104, a heating unit 105, an embossing roller 106, cooling rollers 107, and a laminate take-up roller 107. The heating unit 105 is a unit for thermal melting the first and second thin film layers 2, 4 so that they can bond together through the net-like structure of the base layer 1, and includes a heating roller 109 that is maintained at a temperature ranging from 120 to 150° C. during operation, and a heating cover 110. Furthermore, the transporting speed of the base layer 1, and the thin film layers 2, 4 is controlled in a range from 10 to 35 mm/min.

Figure 4:
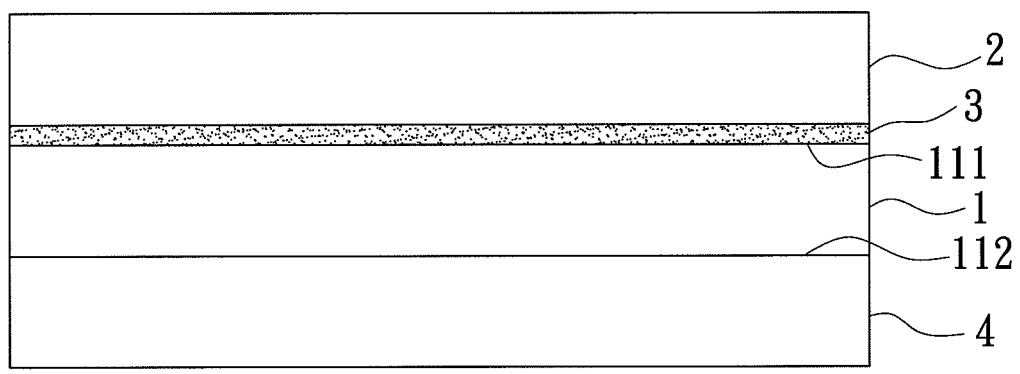
FIG. 4 is a side view illustrating a laminate of the fourth embodiment according to the present invention.

FIG. 4 illustrates the fourth embodiment of the laminate of this invention. In the fourth embodiment, portions, which are the same as those of the second and third embodiments, are denoted by the same reference numbers, and a detailed explanation of the identical portions is omitted below.

In the laminate of the fourth embodiment, the surface 111 of the base layer 1 that faces the first thin film layer 2 is smooth, and the surface 112 of the base layer 1 that faces the second thin film layer 4 is rough and porous. Thus, the first thin film layer 2 is adhered to the surface 111 through the first adhesion layer 3, and the second thin film layer 4 is thermal melted to be directly adhered to the surface 112.

The laminate of the fourth embodiment can be produced by using the calender device in FIG. 6 and by replacing the base layer 1 in the calender device in FIG. 6 with the laminate of the second embodiment.

Figure 5:
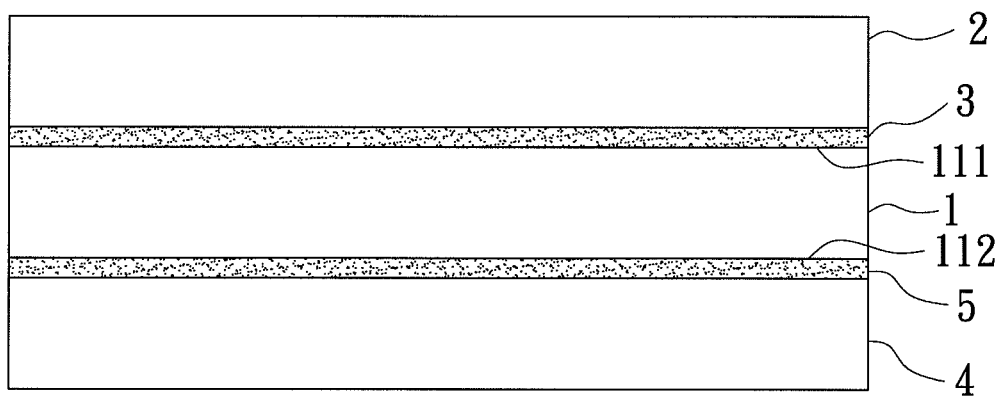
FIG. 5 is a side view illustrating a laminate of the fifth embodiment according to the present invention.

FIG. 5 illustrates the fifth embodiment of the laminate of this invention. The fifth embodiment differs from the fourth embodiment only in that the laminate of the fifth embodiment further comprises a second adhesion layer 5, and that the second thin film layer 4 is adhered to the surface 112 of the base layer 1 through the second adhesion layer 5. Examples of the second adhesion layer 5 are not described herein since they are substantially the same as those of the first adhesion layer 3.

In the fifth embodiment, the first and second adhesion layers 3, 5 can be respectively formed onto the two surfaces 111, 112 of the base layer 1 through a gravure-coating device shown in FIG. 7 or a knife-coating device shown in FIG. 8. Then, the laminate of the fifth embodiment can be produced by using the bonding device in FIG. 10 such that the first and second thin film layers 2, 4 can be adhered to the base layer 1 respectively through the first and second adhesion layers 3, 5.

Figure 11:
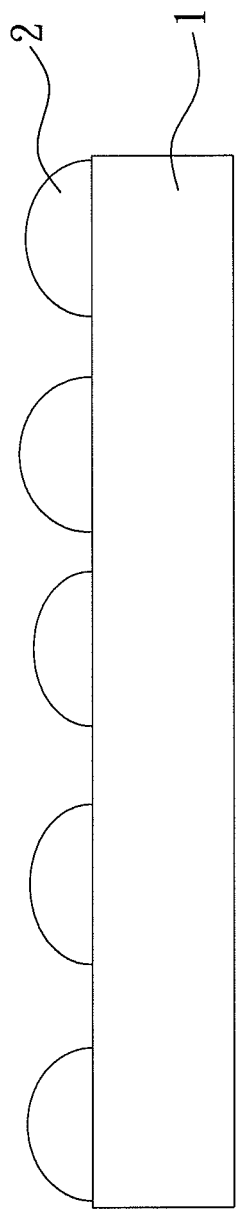
FIG. 11 is a side view illustrating a laminate of the sixth embodiment according to the present invention.

FIG. 11 illustrates the sixth embodiment of the laminate of this invention. The sixth embodiment differs from the first embodiment only in that the first thin film layer 2 is not formed by the thermal melting method but by the coating method.

In detail, the coating method is conducted as follows. First, the PVB-based composition is dissolved in a solvent composition (for example, an alcohol) to form a mixture provided with a predetermined viscosity. Then, the mixture is coated onto the base layer 1 through the gravure-coating device in FIG. 7 or the knife-coating device in FIG. 8. Finally, the mixture is dried to evaporate the solvent composition therein to form the first thin film layer 2 on the base layer 1.

In the sixth embodiment, the mixture is formed by mixing 25 parts by weight of the PVB-based composition and the solvent composition comprised of 40 parts by weight toluene and 35 parts by weight ethanol. The mixture has a viscosity of 32000 cps at 28° C. When the ratio of the PVB-based composition in the mixture is very high, or when the surface of the base layer 1 is very flat, it is possible to obtain the laminate as shown in FIG. 1. Otherwise, as shown in FIG. 11, a laminate where the first thin film layer 2 is discontinuous on the base layer 1 will be fabricated. The non-continuous first thin film layer 2, while having a poor waterproofing property, can still function to reinforce the base layer 1.

Furthermore, the PVB-based composition in the first thin film layer 2 formed by the coating method can be almost the same as that in the first thin film layer 2 produced by the thermal calendering rollers. However, the first thin film layer 2 formed by the coating method will not be rolled by the calender device, and there is no risk about the adhesion of the PVB-based composition onto the calendering rollers. Thus, in the sixth embodiment, the amount of the lubricant preferably ranges from 0~5 parts by weight per 100 parts by weight of the PVB in the PVB-based composition. That is to say, it is also possible to omit the lubricant in this embodiment.

It should be noted that the transporting speed and the operating temperature in all embodiments are adjustably controlled in the above-mentioned range, upon taking the thickness of each layer and the composition thereof into consideration.

The laminate of the present invention can be produced to form one part or the whole body of an article for daily use according to the demand or the design of the article. Examples of the article include a traveling case, a backpack, a bag, a cover, a raincoat, an article of clothing, shoes, an article of furniture, a curtain, automotive upholstery fabrics, a table cloth, a substrate for advertisement, a toy, a tent, a projection screen, an umbrella, etc.

By replacing the PVC-based composition with the PVB-based composition in the laminate of this invention, the laminate is not only provided with the advantage of the prior art laminates, but is also environmentally safe and easy to recycle. Furthermore, the laminate of this invention also has an improved durability/weathering performance.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A laminate, comprising:
a base layer being made from one of woven fabrics, knitted fabrics, and non-woven fabrics, and having two surfaces; and
a first thin film layer made of a polyvinyl butyral-based composition and covering one of said two surfaces of said base layer;
wherein said first thin film layer is formed by dissolving the polyvinyl butyral-based composition in a solvent composition to form a mixture, coating said mixture onto said one of said two surfaces of said base layer through one of gravure coating and knife coating, followed by drying, and has a thickness ranging from 0.001 mm to 0.08 mm.

2. The laminate of claim 1, wherein said base layer is made of a material selected from the group consisting of polyamide fibers, polyester fibers, polyacrylonitrile fibers, polyethylene fibers, polypropylene fibers, polyvinyl alcohol fibers, polytetrafluoroethylene fibers, polyurethane fibers, acetate fibers, triacetate fibers, glass fibers, seed fibers, bast fibers, leaf fibers, and combinations thereof.

3. A laminate, comprising:
a base layer being made from one of woven fabrics, knitted fabrics, and non-woven fabrics, and having two surfaces; and
a first thin film layer made of a polyvinyl butyral-based composition and covering one of said two surfaces of said base layer;
wherein said first thin film layer is melted and directly adhered to said one of said two surfaces of said base layer and has a thickness ranging from 0.05 mm to 1.5 mm.

4. A laminate, comprising:
a base layer being made from one of woven fabrics, knitted fabrics, and non-woven fabrics, and having two surfaces; and
a first thin film layer made of a polyvinyl butyral-based composition and covering one of said two surfaces of said base layer;
wherein:
said polyvinyl butyral-based composition further includes an additive component selected from the group consisting of a plasticizer, a lubricant, an anti-oxidant, an UV absorber, a polymer modifier, a colorant, a filler, and combinations thereof; and
per 100 parts by weight of said polyvinyl butyral in said polyvinyl butyral-based composition, said plasticizer component is in an amount ranging from 3~80 parts, said lubricant is in an amount ranging from 0.05~5 parts, said anti-oxidant is in an amount ranging from 0.1~3 parts by weight, said UV absorber is in an amount ranging from 0.1~3 parts by weight, said polymer modifier is in an amount ranging from 0~100 parts by weight, said colorant is in an amount ranging from 0~12 parts by weight, and said filler is in an amount ranging from 0~150 parts by weight.

5. The laminate of claim 4, wherein said plasticizer is selected from the group consisting of acetyl tributyl citrate, acetyl trioctyl citrate, alkyl benzyl phthalate, alkyl phthalate, blown linseed oil, butyl benzyl phthalate, butyl ricinoleate, castor oil, dialkyl adipate, dialkyl phthalate, dibutyl phthalate, dihexyl adipate, diisononyl cyclohexane-dicarboxylate, dioctyl adipate, dioctyl phthalate, glycol dibutyrate, isodecyl diphenyl phosphate, n-ethyl toluenesulfonamide, polyethylene glycol, tert-butylphenyl diphenyl phosphate, toluenesulfonamide, triaryl phosphate ester blend, tributyl citrate, tricresyl phosphate, triethyl citrate, triethylene, triethylene glycol di-2-ethylhexanoate, triphenyl phosphate, 2-ethylhexyl diphenyl phosphate, and combinations thereof.

6. The laminate of claim 4, wherein said lubricant is selected from the group consisting of polyethylene wax, ethylene bis-stearamide, stearic acid, zinc stearate, calcium stearate, and combinations thereof.

7. The laminate of claim 5, wherein said polymer modifier is selected from the group consisting of polymethyl methacrylate, ethylene-vinyl-acetate copolymer, methyl methacrylate-butadiene-styrene copolymer, styrene-butadiene-styrene block copolymer, and combinations thereof.

8. A laminate, comprising:
a base layer being made from one of woven fabrics, knitted fabrics, and non-woven fabrics, and having two surfaces;
a first thin film layer made of a polyvinyl butyral-based composition and covering one of said two surfaces of said base layer; and
a first adhesion layer;
wherein:
said first thin film layer is adhered to said one of said two surfaces of said base layer through said first adhesion layer;
said first adhesion layer is made of an adhesive selected from the group consisting of a polyurethane adhesive, an acrylate adhesive, a polyvinyl butyral adhesive, a polychloroprene rubber adhesive, and combinations thereof;
said first adhesion layer is made of a polyurethane adhesive including a main agent made of polyurethane and a cross-linker;
said cross-linker is selected from the group consisting of melamine, phenolic resin, di-aldehyde, and isocyanate; and
said cross-linker is in a amount ranging from 1~15 parts by weight per 100 parts by weight of said main agent.

9. A laminate, comprising:
a base layer being made from one of woven fabrics, knitted fabrics, and non-woven fabrics, and having two surfaces;
a first thin film layer made of a polyvinyl butyral-based composition and covering one of said two surfaces of said base layer; and
a second thin film layer made of a polyvinyl butyral-based composition and covering another one of said two surfaces of said base layer.

10. The laminate of claim 9, wherein said second thin film layer is melted and directly adhered to said another one of said two surfaces of said base layer and has a thickness ranging from 0.05 mm to 1.5 mm.

11. The laminate of claim 9, wherein said second thin film layer is formed by dissolving the polyvinyl butyral-based composition in a solvent composition to form a mixture, coating said mixture onto said another one of said two surfaces of said base layer through one of gravure coating and knife coating, followed by drying, and has a thickness ranging from 0.001 mm to 0.08 mm.

12. The laminate of claim 9, further comprising a second adhesion layer, wherein said second thin film layer is adhered to said another one of said two surfaces of said base layer through said second adhesion layer; and wherein said second adhesion layer is made of an adhesive selected from the group consisting of a polyurethane adhesive, an acrylate adhesive, a polyvinyl butyral adhesive, a polychloroprene rubber adhesive, and combinations thereof.

13. An article for daily use, which is selected from the group consisting of a traveling case, a backpack, a bag, a cover, a raincoat, an article of clothing, shoes, an article of furniture, a curtain, automotive upholstery fabrics, a table cloth, a substrate for advertisement, a toy, a tent, a projection screen, and an umbrella, and at least one part of which is made of the laminate according to claim 1.

* * * * *